(12) United States Patent
Watanabe

(10) Patent No.: US 10,521,170 B2
(45) Date of Patent: Dec. 31, 2019

(54) IMAGE FORMING APPARATUS CONFIGURED TO FACILITATE MONITORING IN A COMBINED PUSH-AND-PULL PRINT SYSTEM, PRINT CONTROL SYSTEM, AND PRINT CONTROL METHOD

(71) Applicant: Hodaka Watanabe, Kanagawa (JP)

(72) Inventor: Hodaka Watanabe, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 15/650,044

(22) Filed: Jul. 14, 2017

(65) Prior Publication Data

US 2018/0060004 A1    Mar. 1, 2018

(30) Foreign Application Priority Data

Aug. 26, 2016 (JP) .................................. 2016-166206

(51) Int. Cl.
*G06F 3/12* (2006.01)
*H04N 1/00* (2006.01)
*H04N 1/23* (2006.01)

(52) U.S. Cl.
CPC .......... *G06F 3/1259* (2013.01); *G06F 3/1205* (2013.01); *G06F 3/1212* (2013.01); *G06F 3/1261* (2013.01); *G06F 3/1263* (2013.01); *G06F 3/1288* (2013.01); *H04N 1/00954* (2013.01); *H04N 1/2315* (2013.01);
(Continued)

(58) Field of Classification Search
CPC .... G06F 3/1259; G06F 3/1205; G06F 3/1285; G06F 3/1288; H04N 1/00954; H04N 2201/0094; H04N 1/2315; H04N 2201/0039
USPC ...................................................... 358/1.15
See application file for complete search history.

(56) References Cited

U.S. PATENT DOCUMENTS

| 2007/0046973 A1* | 3/2007 | Toda ...................... G06F 3/1288 358/1.15 |
| 2010/0103458 A1* | 4/2010 | Negishi ................... G06F 3/126 358/1.15 |

(Continued)

FOREIGN PATENT DOCUMENTS

JP    2015-088019    5/2015

*Primary Examiner* — Benny Q Tieu
*Assistant Examiner* — Juan M Guillermety
(74) *Attorney, Agent, or Firm* — Harness, Dickey & Pierce P.L.C.

(57) ABSTRACT

An image forming apparatus includes a print manager to send a print job acquisition request that requests acquisition of print job data to a first information processing apparatus through a network, and receive first print job data sent from the first information processing apparatus as a response to the print job acquisition request through the network, a print job receiver to receive the first print job data sent from the print manager, and second print job data sent from a second information processing apparatus via the network, and an image forming device to execute a print job corresponding at least one of the first print job data and the second print job data, which are received from the print job receiver. The print manager obtains, from the print job receiver, information indicating whether the second print job data is being received from the second information processing apparatus.

18 Claims, 14 Drawing Sheets

(52) U.S. Cl.
CPC .... *G06F 3/1203* (2013.01); *H04N 2201/0039* (2013.01); *H04N 2201/0094* (2013.01)

(56) References Cited

U.S. PATENT DOCUMENTS

| | | | | |
|---|---|---|---|---|
| 2010/0141990 | A1* | 6/2010 | Yamada | H04N 1/00233 |
| | | | | 358/1.15 |
| 2012/0013942 | A1* | 1/2012 | Kuwahara | G06F 3/1263 |
| | | | | 358/1.15 |
| 2012/0206763 | A1* | 8/2012 | Yoshida | G06F 3/1288 |
| | | | | 358/1.15 |
| 2012/0229844 | A1* | 9/2012 | Yada | G06F 3/1288 |
| | | | | 358/1.15 |
| 2013/0014112 | A1* | 1/2013 | Nishida | G06F 3/1288 |
| | | | | 718/100 |
| 2014/0111826 | A1* | 4/2014 | Nakamura | G06K 15/4055 |
| | | | | 358/1.14 |
| 2014/0320883 | A1* | 10/2014 | Ichida | G06F 3/1288 |
| | | | | 358/1.14 |
| 2015/0116764 | A1 | 4/2015 | Mori | |
| 2015/0124288 | A1* | 5/2015 | Tajima | G06F 3/1203 |
| | | | | 358/1.15 |
| 2015/0201107 | A1* | 7/2015 | Hori | G06F 3/1287 |
| | | | | 358/1.15 |
| 2015/0205547 | A1* | 7/2015 | Shiraga | G06F 3/1288 |
| | | | | 358/1.14 |
| 2016/0373592 | A1* | 12/2016 | Chin | H04N 1/00344 |
| 2017/0195506 | A1* | 7/2017 | Kato | G06F 3/1203 |

\* cited by examiner

| ID | PROPERTY INFORMATION ||||| 
|----|----------|----------|---------|-------|---------|
|    | JOB NAME | QUANTITY | PAGE(S) | COLOR | USER ID |
| J1 | aaa.txt  | 1        | 10      | B&W   | U1      |
| J2 | bbb.pdf  | 1        | 1       | B&W   | U1      |
| ⋮  | ⋮        | ⋮        | ⋮       | ⋮     | ⋮       |

| ID | ADDRESS | CONNECTOR |
|----|---------|-----------|
| S1 | xxx.xxx.xxx.xxx | Connector A |
| S2 | yyy.yyy.yyy.yyy | Connector B |
| S3 | zzz.zzz.zzz.zzz | Connector C |
| ⋮  | ⋮ | ⋮ |

| ID | SERVER-FOR-USE ID |
|----|-------------------|
| U1 | S1, S3 |
| U2 | S2, S3 |
| U3 | S1, S3 |
| ⋮ | ⋮ |

FIG. 14

| Title | | |
|---|---|---|
| Select All  Job (s): 10  Update | | Selected Job (s): 10 |
| aaa.txt  Server  2014/01/01  Page: 10 \| Quantity: 1 \| 1Sided \| B&W | | Delete |
| bbb.pdf  Client  2013/12/31  Page: 5 \| Quantity: 1 \| 2Sided \| COLOR | | Settings |
| ccc.doc  External Server  2013/11/01  Page: 50 \| Quantity: 5 \| 1Sided \| B&W | | Print |
| aaa.txt  Server  2013/10/01  Page: 10 \| Quantity: 1 \| 1Sided \| B&W | | |

FIG. 16

| ID | DESTINATION ADDRESS FOR STORAGE | DESTINATION SERVER ID FOR STORAGE | PROPERTY INFORMATION | | | | |
|---|---|---|---|---|---|---|---|
| | | | JOB NAME | QUANTITY | PAGE(S) | COLOR | USER ID |
| J1 | www.www.www.www | S0 | aaa.txt | 1 | 10 | B&W | U1 |
| J2 | www.www.www.www | S0 | bbb.pdf | 1 | 1 | B&W | U1 |
| J1 | zzz.zzz.zzz.zzz | S3 | ccc.doc | 2 | 10 | COLOR | U1 |
| ... | ... | ... | ... | ... | ... | ... | ... |

IMAGE FORMING APPARATUS CONFIGURED TO FACILITATE MONITORING IN A COMBINED PUSH-AND-PULL PRINT SYSTEM, PRINT CONTROL SYSTEM, AND PRINT CONTROL METHOD

CROSS-REFERENCE TO RELATED APPLICATION

This patent application is based on and claims priority pursuant to 35 U.S.C. § 119(a) to Japanese Patent Application No. 2016-166206, filed on Aug. 26, 2016, in the Japan Patent Office, the entire disclosure of which is hereby incorporated by reference herein.

BACKGROUND

Technical Field

The embodiments of present disclosure relate to an image forming apparatus, a print control system, and a print control method.

Related Art

A pull printing system including an image forming apparatus and a print server to provide a printing function using a pull method is known. The image forming apparatus sends a request to the print server for acquiring print job data according to a user instruction and executes one or more print jobs corresponding to the print job data received as a response to the acquisition request. Such an image forming apparatus can efficiently execute a plurality of print jobs in a desired order by monitoring the progress of each print job.

A difficulty arises, however, when the pull printing system is combined with a push printing system, in that the image forming apparatus cannot monitor the progress of such push print jobs, making efficient execution of the two types of job impossible.

SUMMARY

An image forming apparatus includes a print manager, a print job receiver, and an image forming device. The print manager sends a print job acquisition request that requests acquisition of print job data to a first information processing apparatus through a network, and receives first print job data sent from the first information processing apparatus as a response to the print job acquisition request through the network. The print job receiver receives the first print job data sent from the print manager, and second print job data sent from a second information processing apparatus via the network. The image forming device executes a print job corresponding at least one of the first print job data and the second print job data, which are received from the print job receiver. The print manager obtains, from the print job receiver, information indicating whether the second print job data is being received from the second information processing apparatus.

BRIEF DESCRIPTION OF THE SEVERAL VIEWS OF THE DRAWINGS

A more complete appreciation of the disclosure and many of the attendant advantages and features thereof can be readily obtained and understood from the following detailed description with reference to the accompanying drawings, wherein:

FIG. 14 is a diagram illustrating an example of a screen displaying a print job list;

FIG. 16 is a diagram illustrating an example of a print job list;

DETAILED DESCRIPTION

Figure 1:
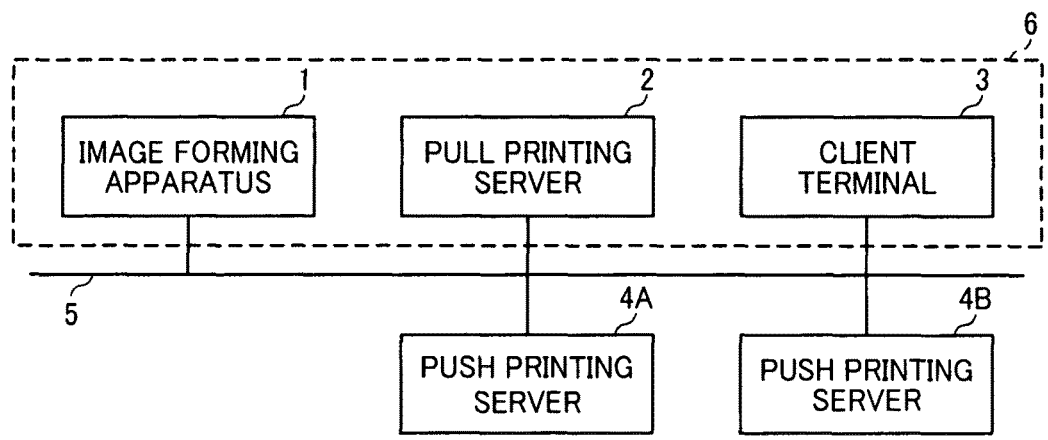
FIG. 1 is a diagram illustrating an example of a configuration of a print control system according to a first embodiment of the present disclosure.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof. In describing preferred embodiments illustrated in the drawings, specific terminology is employed for the sake of clarity. However, the disclosure of this patent specification is not intended to be limited to the specific terminology so selected, and it is to be understood that each specific element includes all technical equivalents that have the same function, operation in a similar manner, and achieve a similar result.

Embodiments of the present disclosure are described below with reference to the attached drawings. Like reference numerals designate identical or corresponding components throughout the several views and a description of the identical or corresponding components is omitted here.

First Embodiment

A print control system according to a first embodiment is described below with reference to FIGS. 1 to 19.

FIG. 1 is a diagram illustrating an example of a configuration of a print control system according to the first embodiment of the present disclosure. The print control system of FIG. 1 includes an image forming apparatus 1, a pull printing server 2 (first information processing apparatus), a client terminal 3, push printing servers 4A and 4B (second information processing apparatus), and a network 5.

The image forming apparatus 1 has a printing function, and may be a printer or a multifunction peripheral (MFP) that includes a printer. The image forming apparatus 1 receives print job data from the pull printing server 2 and the push printing servers 4A and 4B, and executes one or more print jobs corresponding to the received print job data.

The print job data includes print data and print job information. The print data is image data representing an image to be printed. The print information includes properties of each print job. The print job is defined as a process of printing the print data included in the print job data according to the print job information included in the print job data. A detailed description of the print job information is deferred.

The pull printing server 2 is a server computer that stores the print job data received from the client terminal 3. The pull printing server 2 sends the stored print job data to the image forming apparatus 1 in response to a request from the image forming apparatus 1. In FIG. 1, the pull printing server 2 is connected to the image forming apparatus 1 via the network 5, however, the embodiment is not limited to this configuration and alternatively the pull printing server 2 may be provided in the image forming apparatus 1.

The client terminal 3 is a client computer that generates the print job data according to operation of a user. The client terminal 3 sends the generated print job data to the pull printing server 2 and the push printing servers 4A and 4B.

The push printing servers 4A and 4B are server computers that store the print job data received from the client terminal 3. The push printing servers 4A and 4B send the stored print job data to the image forming apparatus 1 in response to a request from the image forming apparatus 1. In FIG. 1, the print control system includes the two push printing servers 4A and 4B, however, the embodiment is not limited to this and the print control system may also include one or more than three push printing servers. Hereinafter, one or more push printing servers included in the print control system may be collectively or individually described as a push printing server 4.

The network 5 connects the pull printing server 2, the client terminal 3, and the push printing server 4 to each other. The network 5 is, for example, a wireless or a wired local area network (LAN).

In this embodiment, the image forming apparatus 1, the pull printing server 2, and the client terminal 3 constitute a pull printing system 6, as illustrated with a dotted line in FIG. 1. In the pull printing system 6, the image forming apparatus 1 sends a request for acquiring print job data to the pull printing server 2 according to an instruction from the user. The image forming apparatus, then, receives the print job data from the pull printing server 2 as a response to the request, and executes one or more print jobs corresponding to the print job data. Hereinafter, the request for acquiring print job data may be referred to as a print job acquisition request. A print method described above is referred to as a pull method. The pull printing server 2 is a printing server that uses the pull method of printing.

On the other hand, the push printing server 4 and the image forming apparatus 1 constitute a push printing system. The push printing server 4 does not include an interface with which the print job data can be acquired externally, and thus the image forming apparatus 1 is not enabled to send a request for acquiring the print job data to the push printing server 4. That is, in the push printing system, the push printing server 4 sends the print job data to the image forming apparatus 1 without receiving a print job acquisition request, and the image forming apparatus 1 executes one or more print jobs corresponding to the print job data. The push printing system, accordingly, is different from the pull printing system. This type of print method is referred to as a push method. The push printing server 4 is a printing server that uses the push method of printing. In this embodiment, the push printing server 4 is an external server to the pull printing system 6.

Figure 2:
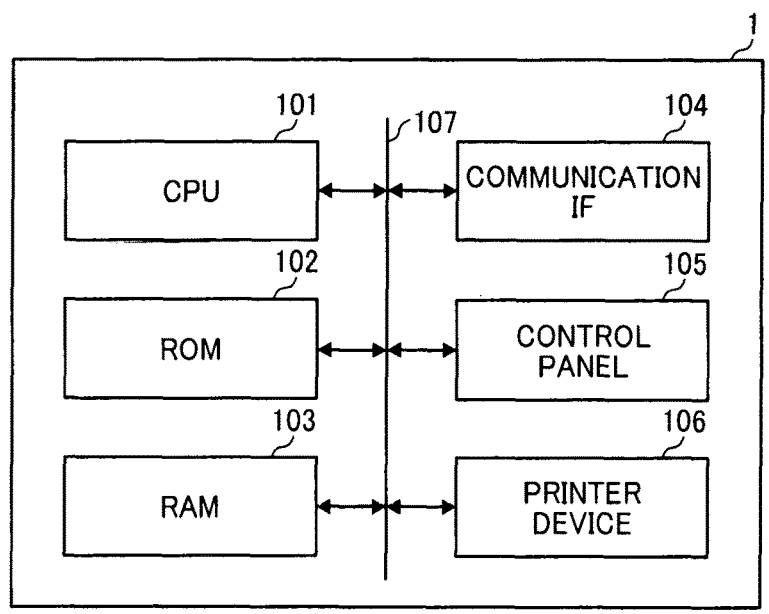
FIG. 2 is a diagram illustrating an example of a hardware configuration of an image forming apparatus according to the first embodiment of the present disclosure.
Figure 3:
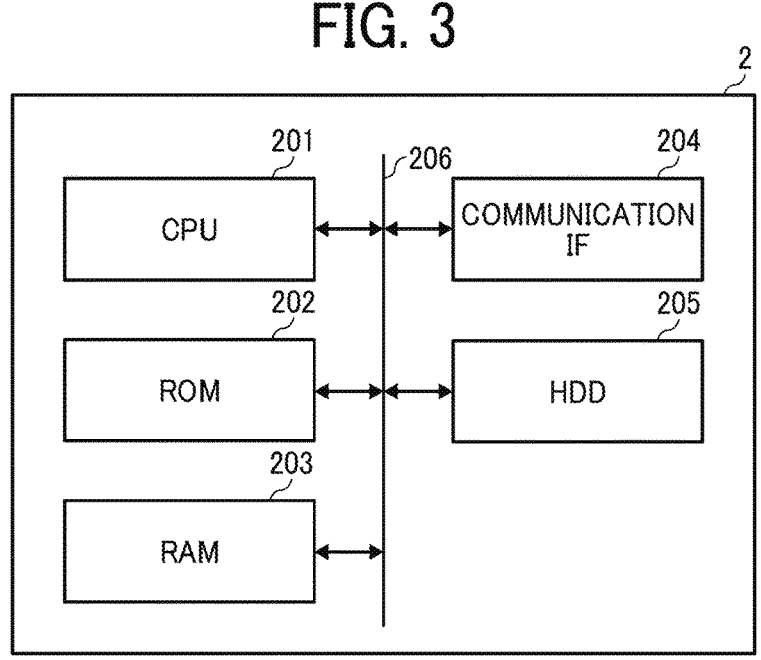
FIG. 3 is a diagram illustrating an example of a hardware configuration of a pull printing server according to the first embodiment of the present disclosure.
Figure 4:
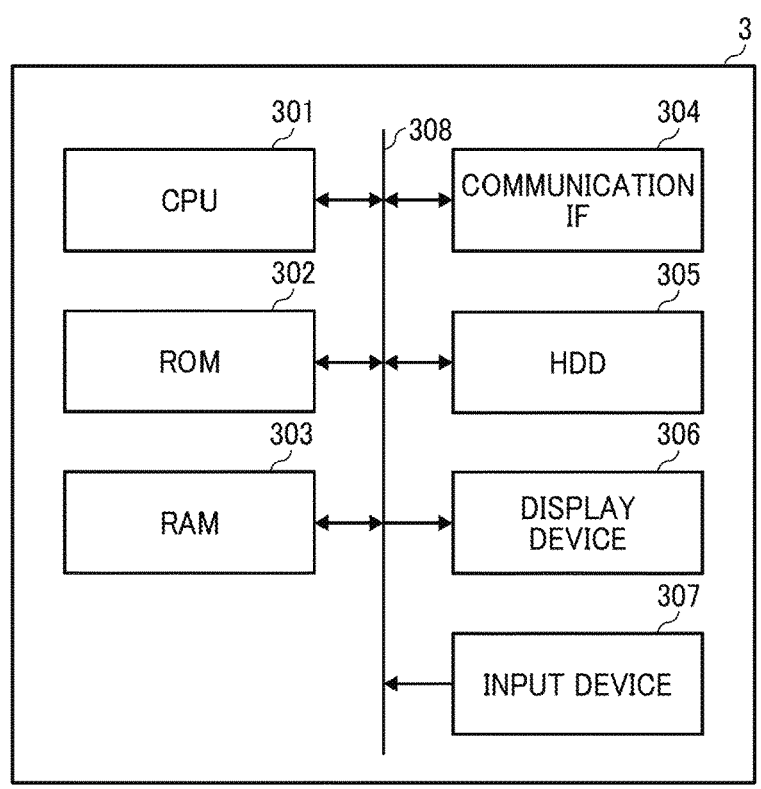
FIG. 4 is a diagram illustrating an example of a hardware configuration of a client terminal according to the first embodiment of the present disclosure.

Referring now to FIGS. 2 to 4, hardware configurations of the image forming apparatus 1, the pull printing server 2, and the client terminal 3 are described. A hardware configuration of the push printing server 4 is substantially similar to the pull printing server 2, and a description thereof is omitted here.

FIG. 2 is a diagram illustrating an example of the hardware configuration of the image forming apparatus 1. The image forming apparatus 1 of FIG. 2 includes a central processing unit (CPU) 101, a read only memory (ROM) 102, a random access memory (RAM) 103, a communication interface 104, a control panel 105, a printer device 106, and a bus 107.

The CPU 101 executes one or more programs to perform various types of operation to implement functions of the image forming apparatus 1. The ROM 102 stores the one or more programs executed by the CPU 101. The RAM 103 is mainly used as a working area where the CPU 101 executes the one or more programs. The RAM 103 also stores various types of data including the print job data. The communication interface 104 connects the image forming apparatus 1 to the network 5. The control panel 105 is an input and output device of the image forming apparatus 1. The control panel 105 includes, for example, a touch panel, a liquid crystal display, and an operation key. The printer device 106 executes a print job according to an instruction from the CPU 101. The printer device 106 may be a laser type or an inkjet type. The bus 107 connects the CPU 101, the ROM 102, the RAM 103, the communication interface 104, and the control panel 105 to each other.

FIG. 3 is a diagram illustrating an example of the hardware configuration of the pull printing server 2. The pull printing server 2 of FIG. 3 includes a CPU 201, a ROM 202, a RAM 203, a communication interface 204, a hard disc drive (HDD) 205, and a bus 206.

The CPU 201 executes one or more programs to perform various types of operation to implement functions of the pull printing server 2. The ROM 202 stores the one or more programs executed by the CPU 201. The RAM 203 is mainly used as a working area where the CPU 201 executes the one or more programs. The communication interface 204 connects the pull printing server 2 to the network 5. The HDD 205 stores the print job data received from the client terminal 3. The bus 206 connects the CPU 201, the ROM 202, the RAM 203, the communication interface 204, and the HDD 205 to each other.

FIG. 4 is a diagram illustrating an example of the hardware configuration of the client terminal 3. The client terminal 3 of FIG. 4 includes a CPU 301, a ROM 302, a RAM 303, a communication interface 304, an HDD 305, a display device 306, an input device 307, and a bus 308.

The CPU 301 executes one or more programs to perform various types of operation to implement functions of the client terminal 3. The ROM 302 stores one or more programs executed by the CPU 301. The RAM 303 is mainly used as a working area where the CPU 301 executes the one or more programs. The communication interface 304 connects the client terminal 3 to the network 5. The HDD 305 stores various types of data. The display device 306 may be, for example, a liquid crystal display, a plasma display, or a cathode ray tube display. The input device 307 includes, for example, a mouse, a key board, and a touch panel. The bus 308 connects the CPU 301, the ROM 302, the RAM 303, the communication interface 304, the HDD 305, the display device 306, and the input device 307 to each other.

Referring now to FIGS. 5 to 8, functional configurations of the image forming apparatus 1, the pull printing server 2, the client terminal 3, and the push printing server 4 are described.

Figure 5:
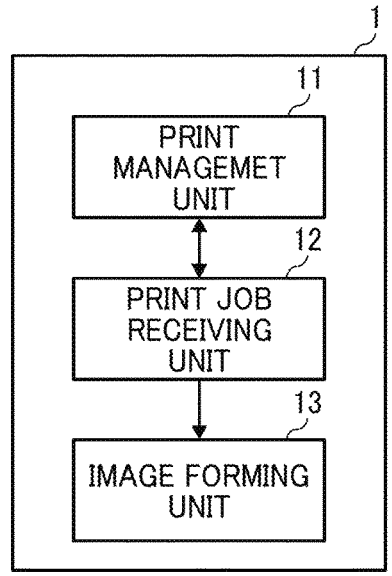
FIG. 5 is a diagram illustrating an example of a functional configuration of the image forming apparatus according to the first embodiment of the present disclosure.

FIG. 5 is a diagram illustrating an example of the functional configuration of the image forming apparatus 1. The image forming apparatus 1 of FIG. 5 includes a print management unit 11, a print job receiving unit 12, and an image forming unit 13. Each functional element mentioned above is implemented by executing a program by the CPU 101.

The print management unit 11 sends a print job acquisition request to the pull printing server 2, receives print job data corresponding to one or more print jobs associated with the pull method from the pull printing server 2 as a response to the job acquisition request, monitors the progress of each of one or more print jobs to manage execution of the one or more print jobs. That is, the print management unit 11 manages the one or more print jobs to be executed with the pull method. On the other hand, the print management unit 11, according to the embodiment, does not receive print job data associated with the push method nor directly monitor progress of a print job associated with the push method. The print job receiving unit 12 receives the print job data and then transmits the print job data to the image forming unit 13. The print job receiving unit 12 corresponds to a receiving port of the image forming unit 13. The print job receiving unit 12 receives the print job data associated with the push method from the push printing server 4 and the print job data associated with the pull method from the print management unit 11. The image forming unit 13 performs a predetermined processing on the received print job data received from the print job receiving unit 12 to execute a print job. The image forming unit 13 causes the printer device 106 to execute each print job.

Figure 6:
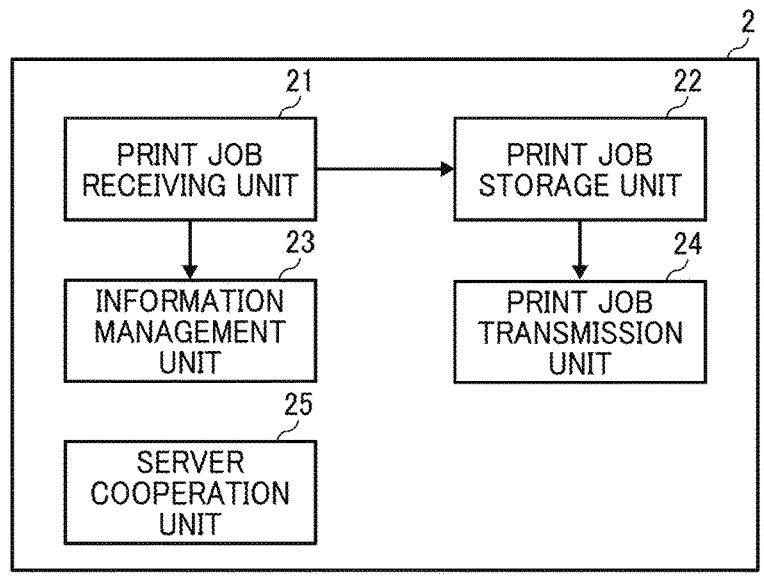
FIG. 6 is a diagram illustrating an example of a functional configuration of the pull printing server according to the first embodiment of the present disclosure.

FIG. 6 is a diagram illustrating an example of the functional configuration of the pull printing server 2. The pull printing server 2 of FIG. 6 includes a print job receiving unit 21, a print job storage unit 22, an information management unit 23, a print job transmission unit 24 (first print job transmission unit), and a server cooperation unit 25. Each functional element mentioned above is implemented by executing a program by the CPU 201.

The print job receiving unit 21 receives print job data from the client terminal 3. The print job storage unit 22 stores the print job data received with the print job receiving unit 21.

The information management unit 23 registers the one or more print jobs corresponding to the print job data received with the print job receiving unit 21. More specifically, the information management unit 23 has a print job table, and stores print job information included in the print job data received with the print job receiving unit 21 in the print job table. Additionally, the information management unit 23 includes a server information table and a user information table. The information management unit 23 also generates a print job list in response to a request from the image forming apparatus 1. Detailed descriptions of the print job table, the server information table, the user information table, and the print job list are deferred.

The print job transmission unit 24 sends the print job data stored in the print job storage unit 22 in response to a print job acquisition request from the image forming apparatus 1.

The server cooperation unit 25 causes the pull printing system 6 to operate in cooperation with the push printing server 4. In the embodiment, the server cooperation unit 25 receives a print job start request addressed to the push printing server 4 from the image forming apparatus 1, and converts the print job start request into a format appropriate for the push printing server 4. The server cooperation unit 25, then, sends the converted print job start request to the push printing server 4. The server cooperation unit 25 has a conversion logic (connector) to convert the print job start request, for each push printing server 4 included in the print control system. Adding the conversion logic to the server cooperation unit 25 can add another new push printing server 4 to the print control system.

Figure 7:
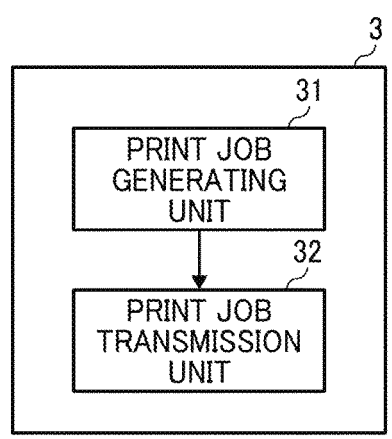
FIG. 7 is a diagram illustrating an example of a functional configuration of the client terminal according to the first embodiment of the present disclosure.

FIG. 7 is a diagram illustrating an example of the functional configuration of the client terminal 3. The client terminal 3 of FIG. 7 includes a print job generating unit 31 and a print job transmission unit 32. Each functional element mentioned above is implemented by executing a program by the CPU 301.

The print job generating unit 31 generates print job data based on information input by a user. The print job transmission unit 32 sends the print job data generated with the print job generating unit 31 to the pull printing server 2.

Figures 8, 9, 10:
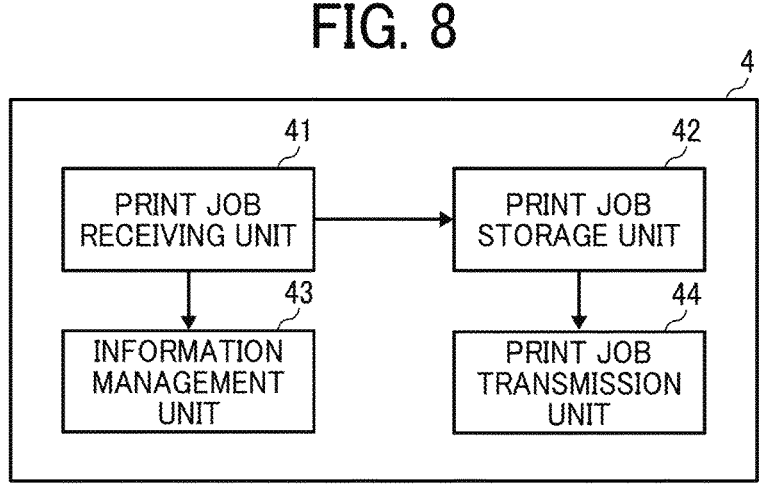
FIG. 8 is a diagram illustrating an example of a functional configuration of a push printing server according to the first embodiment of the present disclosure.
FIG. 9 is a table illustrating an example of print job information.
FIG. 10 is a table illustrating an example of server information.

FIG. 8 is a diagram illustrating an example of the functional configuration of the push printing server 4. The push printing server 4 of FIG. 8 includes a print job receiving unit 41, a print job storage unit 42, an information management unit 43, and a print job transmission unit (second print job transmission unit) 44. Each functional element mentioned above is implemented by executing a program by the CPU of the push printing server 4.

The print job receiving unit 41 receives the print job data from the client terminal 3, an external client terminal of the pull printing system 6, and the like. The print job storage unit 42 stores the print job data received with the print job receiving unit 41.

The information management unit 43 registers one or more print jobs corresponding to the print job data received with the print job receiving unit 41. More specifically, the information management unit 43 has a print job table, and stores print job information included in the print job data received with the print job receiving unit 41 in the print job table. A detailed description of the print job table is deferred.

The print job transmission unit 44 sends the print job data stored in the print job storage unit 42 to the image forming apparatus 1 in response to the print job start request from the image forming apparatus 1.

FIG. 9 is an example of the print job table in the information management units 23 and 43. In the example of the table illustrated in FIG. 9, the print job information for each job includes a job identification (ID) and property information, which are associated with each other. The job ID is an identifier of a print job. The property information indicates properties of a corresponding print job, and includes a job name, the number of copies (quantity), the number of pages, a color, and a user ID. The color indicates whether the corresponding print job is monochrome printing or color printing. The user ID indicates a user who registers the corresponding print job. For example, in a case of a print job having the job ID of J1, the job name is aaa.txt, the number of copies is 1, the number of pages is 10, and the color is B&W (monochrome). Here in the description, to store print job information in the print job table as illustrated in FIG. 9 is also expressed as to register a print job. The property information is not limited to the example mentioned above.

FIG. 10 is an example of the server information table in the information management unit 23. The server information table is a table to manage the one or more push printing servers 4 connected to the pull printing system 6, and stores sever information related to each push printing servers 4. In the example of the table illustrated in FIG. 10, the server information related to each push printing servers 4 includes a server ID, an address, and a connector, which are associated each other. The server ID is an identifier of a corresponding push printing server 4. The address is an internet protocol (IP) address of the corresponding push printing server 4. The connector is an interface used by the pull printing server 2 for connecting to the corresponding push printing server 4. For example, in a case of the push printing server 4 having the sever ID of S1, the address is xxx.xxx.xxx.xxx, and the connector is Connector A.

Figures 11, 12:
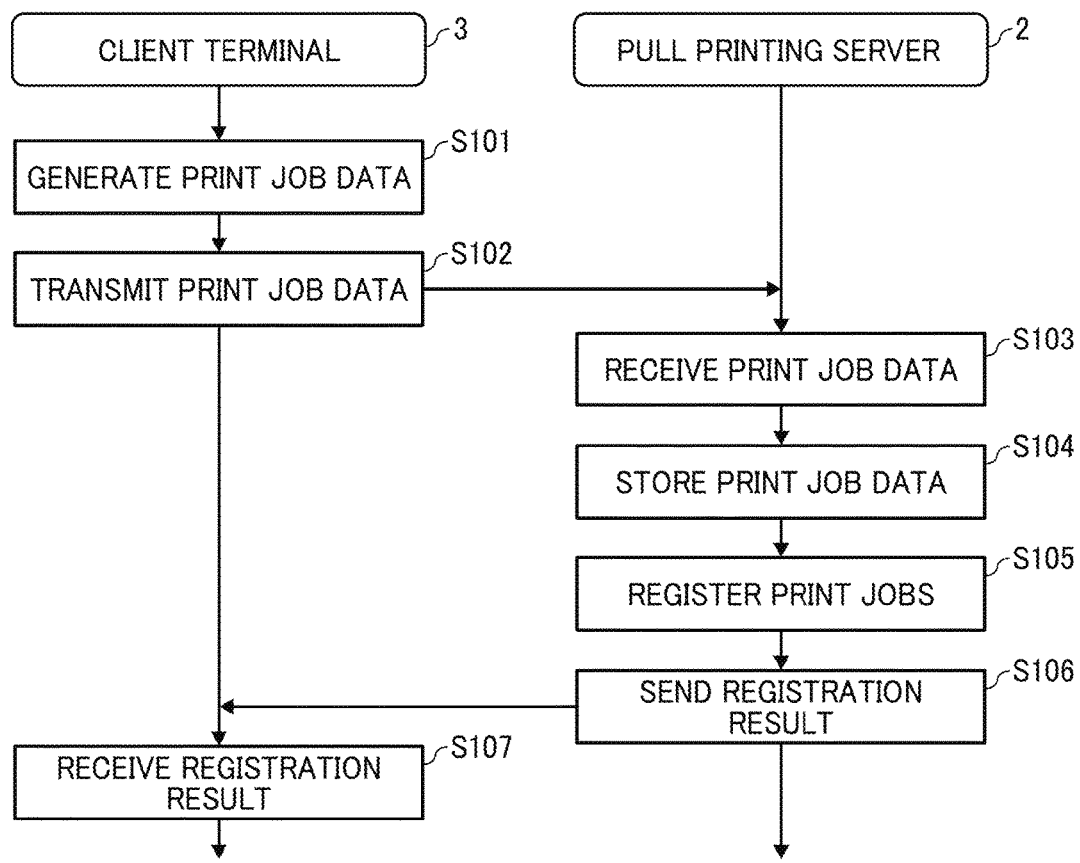
FIG. 11 is a table illustrating an example of user information.
FIG. 12 is a sequence diagram illustrating an example process of storing print job data.

FIG. 11 is an example of the user information table in the information management unit 23. The user information table is a table to manage one or more users using the print control system, and stores user information per user. In the example of the table illustrated in FIG. 11, the user information for each user includes a user ID and a server-for-use ID, which are associated with each other. The user ID is an identifier of the corresponding user. The server-for-use ID is a server ID that is registered in advance as a server to be used by a corresponding user. For example, in a case of a user having the user ID of U1, the server-for-use IDs are S1 and S3.

The following describes operation of the print control system according to the embodiment of the present disclosure. Storing print job data and executing a print job are individually described below.

FIG. 12 is a sequence diagram illustrating an example process of storing the print job data from the client terminal 3 to the pull printing server 2. Hereinafter, this process may be referred to simply as the process of storing. The processing of S101, S102, and S107 in FIG. 12 are performed by the client terminal 3. The processing of S103 to S106 in FIG. 12 is performed by the pull printing server 2. Storing the print job data to the push printing server 4 is the same as the process illustrated in FIG. 12, and a description thereof is omitted here.

When a user operates the input device 307 of the client terminal 3 to instruct the client terminal 3 to store print job data, the process of storing illustrated in FIG. 12 starts. When the process of storing starts, the print job generating unit 31 of the client terminal 3 generates the print job data corresponding to an inputted instruction (S101). As described above, the print job data includes the print data and the print job information. The print job generating unit 31 passes the generated print job data to the print job transmission unit 32. On receiving the print job data, the print job transmission unit 32 sends the print job data to the pull printing server 2 (S102).

The print job receiving unit 21 of the pull printing server 2 receives the print job data sent from the client terminal 3 via the network 5 (S103). The print job receiving unit 21 stores the received print job data in the print job storage unit 22 (S104). The print job receiving unit 21 passes the received print job data to the information management unit 23.

On receiving the print job data, the information management unit 23 stores the print job information included in the print job data in the print job table. That is, the information management unit 23 registers a print jobs corresponding to the print job data to the pull printing server 2 (S105). The information management unit 23 sends a registration result to the client terminal 3 after registering the print jobs (S106).

The client terminal 3 receives the registration result sent from the pull printing server 2 via the network 5 (S107). After the client terminal 3 receives the registration result, the process of storing the print job data is completed.

Figure 13:
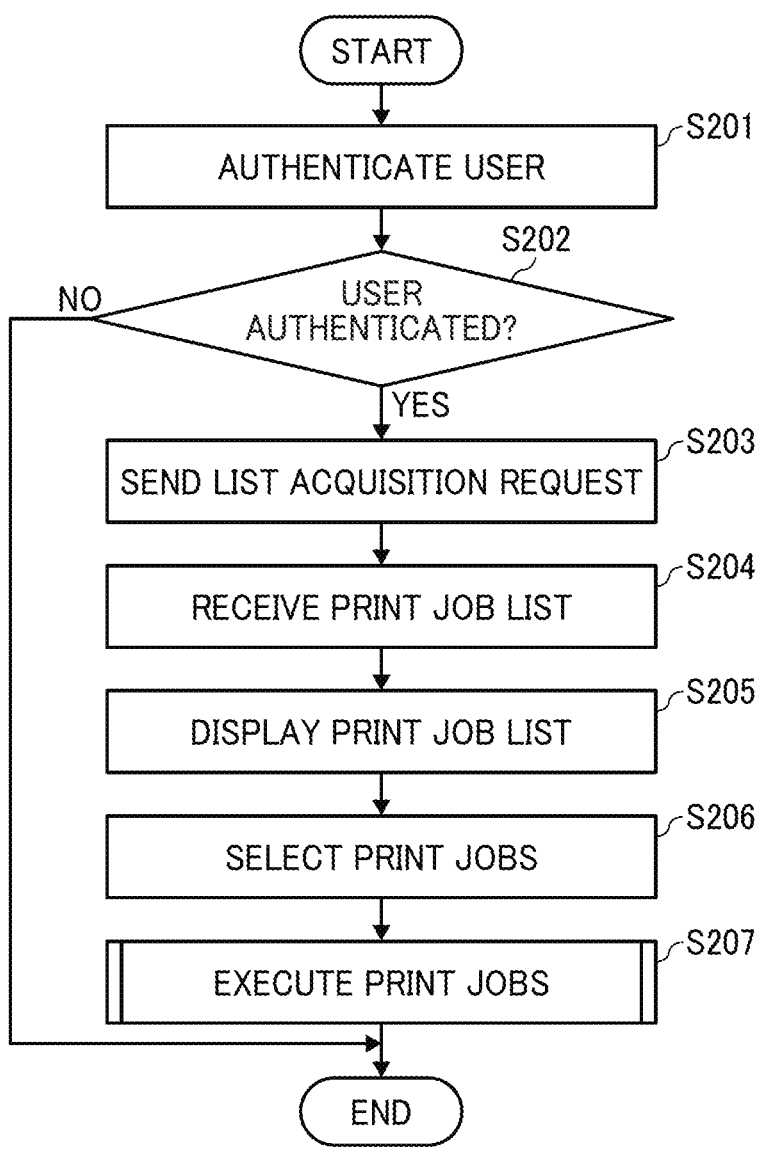
FIG. 13 is a flowchart illustrating a schematic process of performing a print job.

FIG. 13 is a flowchart illustrating a schematic process of executing a print job by the image forming apparatus 1.

The image forming apparatus 1 performs user authentication (S201). More specifically, the image forming apparatus 1 requests input of a user ID, a password, and the like to a user. Such authentication information may be input from the control panel 105 of the image forming apparatus 1 by the user, or sent from a user terminal via a wireless communication, for example.

The image forming apparatus 1 performs the user authentication with the authentication information being input. The user authentication is performed by referring a table in which an input user ID is to be associated with an apparatus ID of the image forming apparatus 1. This means that the user of the user ID input is permitted to use the image forming apparatus 1 of which the apparatus ID is associated with the user ID input.

Alternatively, the image forming apparatus 1 may perform the user authentication using an external authentication server connected via the network 5. In this case, the image forming apparatus 1 may send the authentication information input by the user to the authentication server, and receive a result of the authentication from the authentication server.

When the user authentication fails (S202: NO), the process of executing the print jobs is completed. On the other hand, the user authentication succeeds (S202: YES), the user logs in to the image forming apparatus 1. When the user logs in, the image forming apparatus 1 displays a log-in screen on the control panel 105.

The print management unit 11 sends a list acquisition request to the pull printing server 2 when the user selects a display of a print job list from a menu on the control panel 105 (S203). The list acquisition request is a request for a print job list. The list acquisition request includes the user ID of the current user. On receiving the list acquisition request, the pull printing server 2 generates a print job list that is a list of the one or more print jobs registered to the pull printing server 2 and the push printing server 4 by the logged in user, and sends the generated print job list to the print management unit 11. A detailed description of a process of generating a print job list is deferred.

The print management unit 11 receives the print job list sent from the pull printing server 2 (S204), and causes the control panel 105 to display the print job list (S205).

FIG. 14 is a diagram illustrating an example of a display screen of the print job list displayed on the control panel 105. The display screen of FIG. 14 displays a title of the display screen (Title), a button for selecting all jobs (Select All), the number of jobs, and a button for updating jobs (Update).

The button for selecting all jobs is for selecting all jobs that are included in a print job list. The number of jobs is a total number of print jobs included in a print job list. The button for updating is for updating a display of a display screen.

In addition, on the display screen of FIG. 14, the number of selected jobs, a button for deleting (Delete), a button for setting (Settings), and a button for printing (Print) are displayed.

The number of selected jobs is a total number of print jobs that are selected by a current user. The button for deleting is for deleting any print job from the selected print jobs. The button for setting is for setting various parameters used in executing the selected print jobs (e.g., an order of executing the print jobs). The button for printing is for executing the selected print jobs.

Additionally, on the display screen of FIG. 14, one or more print job buttons corresponding to the one or more print jobs included in the print job list are displayed as a print job list. The print job button is for selecting a print job by a current user. In the print job button for each print job, a job name, a registered date and time, the number of pages (Page), the number of copies (Quantity), the number of sides, a color, and a registration destination of the print job are displayed, as illustrated in FIG. 14. Regarding the number of sides, 1 Sided indicates simplex printing and 2 Sided indicates duplex printing. Regarding the color, B&W indicates monochrome printing and COLOR indicates color printing. Regarding the registration destination, Server indicates the registration destination is pull printing server 2, External Server indicates the registration destination is a push printing server 4, and Client indicates the registration destination is the client terminal 3. The registration destination includes the client terminal 3 for a case where the client terminal 3 can store the print job data.

When the display screen as illustrated in FIG. 14 is displayed on the control panel 105, the user operates the one or more print job buttons, the button for selecting all, the button for deleting, and the like to select one or more print jobs to be executed from the print job list displayed (S206). In the example illustrated in FIG. 14, 10 jobs are selected and all of the print jobs are selected.

When the user operates the button for printing after selecting the one or more print jobs, the image forming apparatus 1 executes the one or more print jobs selected by the user one by one (S207). A detailed description of executing a print job is deferred.

Figure 15:
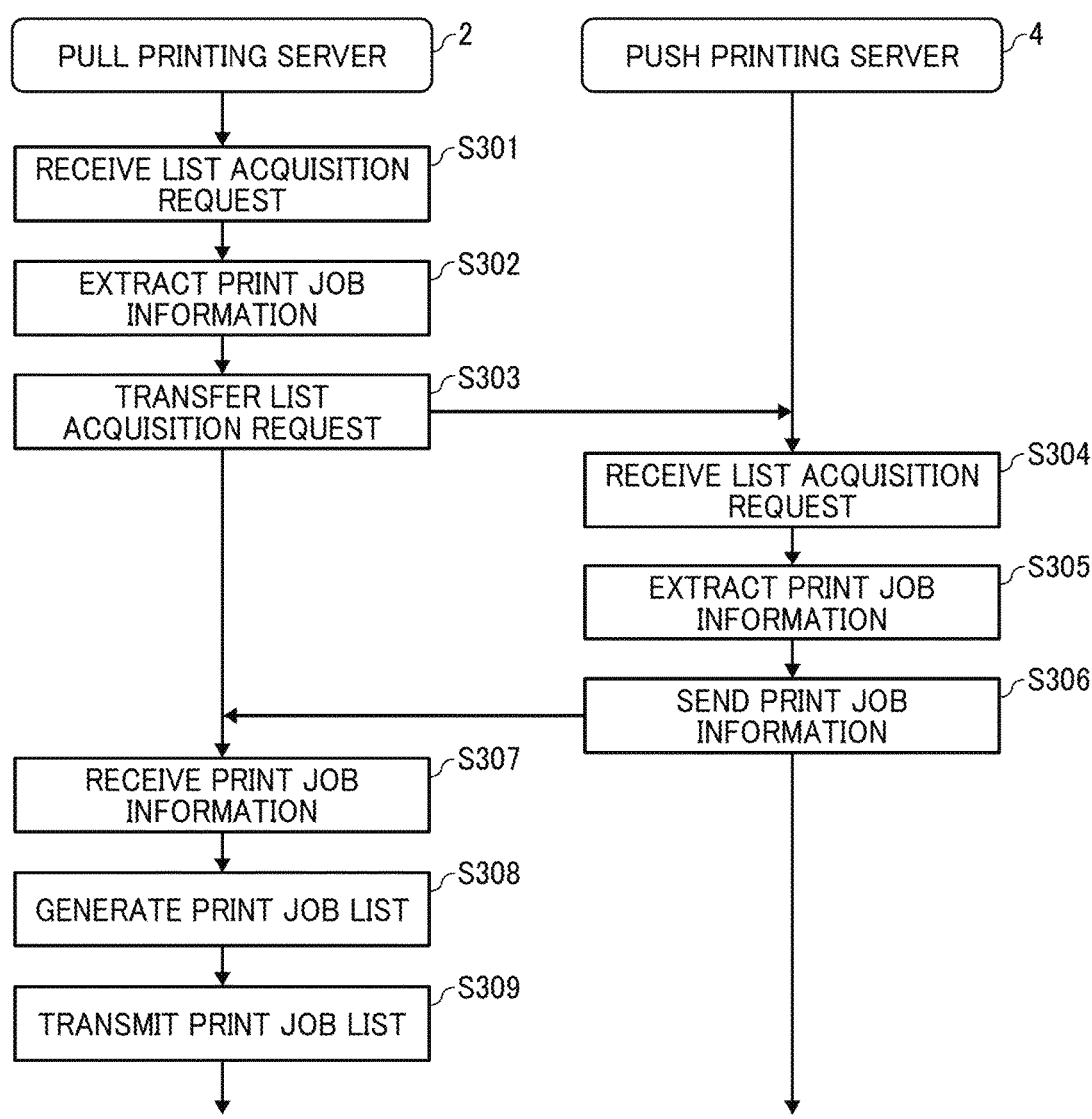
FIG. 15 is a flowchart illustrating an example process of generating a print job list.

FIG. 15 is a sequence diagram illustrating an example process of generating a print job list. The processing from S301 to S303 and S307 to S309 in FIG. 15 are performed by the pull printing server 2. The processing from S304 to S306 in FIG. 15 is performed by the push printing server 4. The process of generating a print job list illustrated in FIG. 15 is performed between S203 and S204 in FIG. 13.

The image forming apparatus 1 sends a list acquisition request to the pull printing server 2 (S203 in FIG. 13), and the information management unit 23 of the pull printing server 2 receives the list acquisition request (S301). On receiving the list acquisition request, the information management unit 23 refers to the print job table and extracts print job information associated with the same user ID included in the list acquisition request (S302). The print job information extracted as described above corresponds to the one or more print jobs registered in the pull printing server 2 by the user.

Subsequently, the information management unit 23 refers to the user information table, and acquires a sever-for-use ID associated with the user ID included in the list acquisition request. The information management unit 23, then, transfers the list acquisition request to the push printing server 4 corresponding to the acquired server-for-use ID (S303).

The pull printing server 2 transfers the list acquisition request to the push printing server 4, and the information management unit 43 of the push printing server 4 receives the list acquisition request (S304). In response to the receipt of the list acquisition request, the information management unit 43 extracts print job information corresponding to the same user ID included in the list acquisition request by referring the print job table (S305). The print job information extracted as described above corresponds to a list of the one or more print jobs registered in the push printing server 4 by the user. Subsequently, the information management unit 43 sends the extracted print job information to the pull printing server 2 (S306).

The information management unit 23 of the pull printing server 2 receives the print job information sent from the push printing server 4. (S307). Subsequently, the information management unit 23 generates a print job list based on the print job information received from the push printing server 4 and the print job information extracted in S302 (S308).

The information management unit 23 combines the print job information received from the push printing server 4 and the print job information extracted in S302, and adds a storage destination address and a storage destination server ID for each print job to generate a print job list. The storage destination address is an IP address of a server that stores print job data. The storage destination ID is an identifier of a server that stores print job data.

FIG. 16 is a table illustrating an example of a print job list generated by the pull printing server 2. The print job list of FIG. 16 illustrates print jobs associated with a user having the user ID, U1. In FIG. 16, S0 is an ID of the pull printing server 2 and S3 is an ID of the push printing server 4 used by the user.

The print job list of FIG. 16 is generated as describe above, namely by combining the print job information registered in the pull printing server 2 and the print job information registered in the push printing server 4 by the user and then adding the storage destination address and the storage destination server ID for each print job. By adding the storage destination address and the storage destination server ID to the print job list as described above, each print job can be identified even when some print job IDs registered in each of the servers overlap.

After generating the print job list as illustrated in FIG. 16, the information management unit 23 sends the print job list to the image forming apparatus 1 (S309 in FIG. 15). Then, the print management unit 11 of the image forming apparatus 1 receives the print job list (S204 in FIG. 13).

Figure 17:
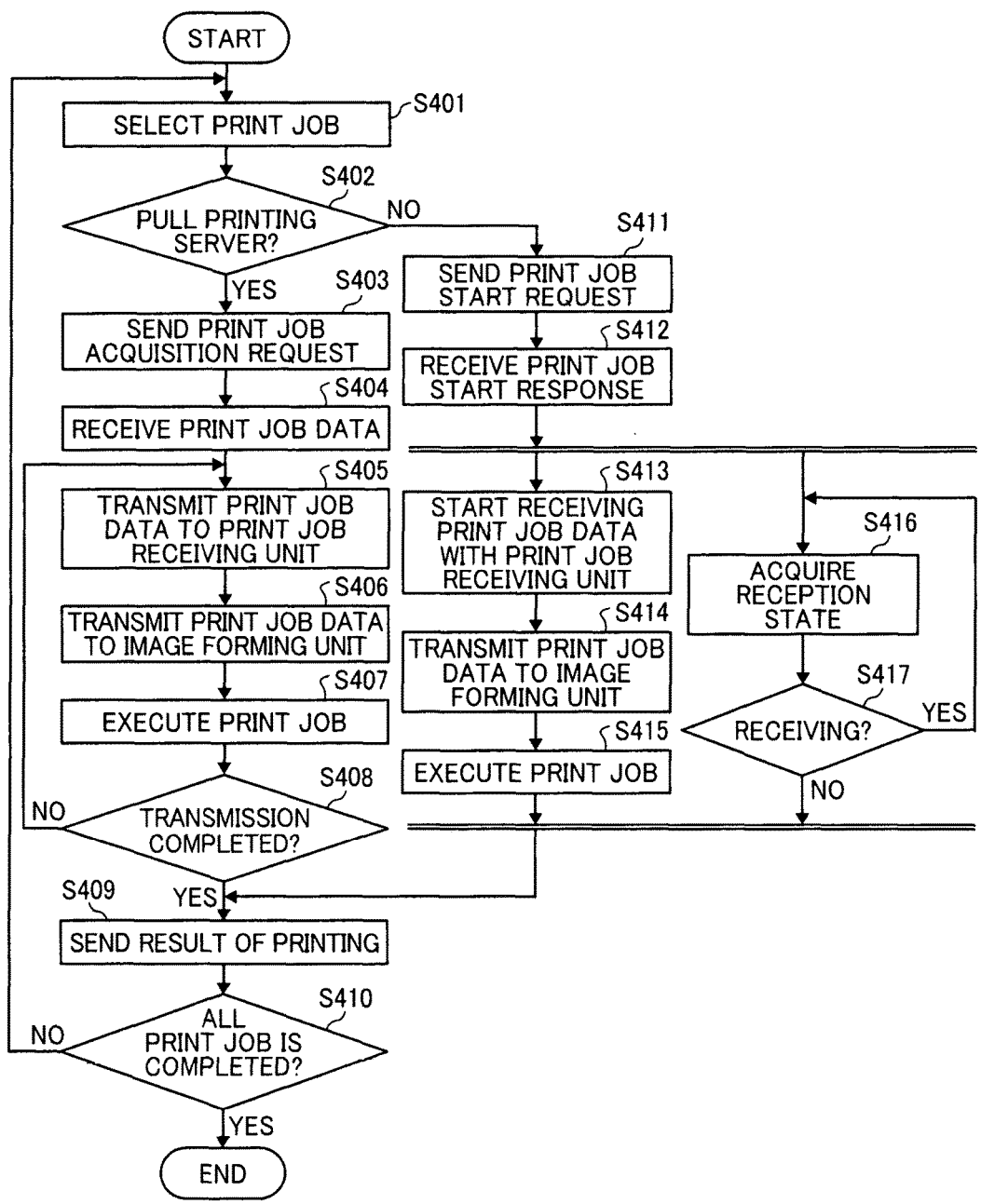
FIG. 17 is a flowchart illustrating an example process of performing a print job.

FIG. 17 is a flowchart illustrating an example process of executing a print job by the image forming apparatus 1 according to the embodiment. The process of FIG. 17 corresponds to the internal process of S207 in FIG. 13.

When one or more print jobs are selected and instructed to be executed by the user, the print management unit 11 selects one print job from the selected one or more print jobs (S401). An order to select a print job with the print management unit 11 may be set in advance, for example, may be set in an order of date of registered in the server, or may be set by the user's operation with the setting button of the control panel 105.

When the selected print job is a print job that is registered in the pull printing server 2 (S402: YES), the print management unit 11 sends the print job acquisition request to the pull printing server 2 (S403).

The print job acquisition request includes a print job ID that is corresponding to print job data that is requested to be sent, an address ID and an apparatus ID of the pull printing server 2 that is a destination for storing the print job data (destination of the print job acquisition request), and an address and an apparatus ID of the image forming apparatus 1 that is a destination of the transmission of the print job data.

The print management unit 11 sends the print job acquisition request, and the print job transmission unit 24 of the pull printing server 2 receives the print job acquisition request. The print job transmission unit 24, then, acquires the print job data according to the received print job acquisition request from the print job storage unit 22, and transmits the print job data to the print management unit 11. The print management unit 11 receives the print job data (S404).

After receiving the print job data, the print management unit 11 transmits the received print job data to the print job receiving unit 12 at a predetermined timing (S405). The print management unit 11 may transmit the print job data to the print job receiving unit 12 each time when receiving a part of the print job data from the pull printing server 2. Alternatively, the print management unit 11 may transmit the print job data to the print job receiving unit 12 after receiving all of the print job data from the pull printing server 2.

The print job receiving unit 12 transmits the print job data to the image forming unit 13 each time when receiving the print job data form the print management unit 11 (S406). On receiving the print job data from the print job receiving unit 12, the image forming unit 13 performs predetermined processing on the print job data to execute the corresponding print job (S407).

After that, the processing from S405 to S407 is repeated until the all of the print job data is completely transmitted from the print management unit 11 to the print job receiving unit 12 (S408). When the print management unit 11 completes the transmission of the all of the print job data to the print job receiving unit 12 (S408: YES), the print management unit 11 determines that the execution of the corresponding print job is completed and sends a result of printing to the pull printing server 2 (S409).

If the one or more print jobs selected by the user is not completed (S410: NO), the process returns to S401, and the print management unit 11 selects a next print job to be executed. On the other hand, if the all of the one or more print jobs selected by the user are completed (S410: YES), the process of executing the one or more print jobs are completed.

Figure 18:
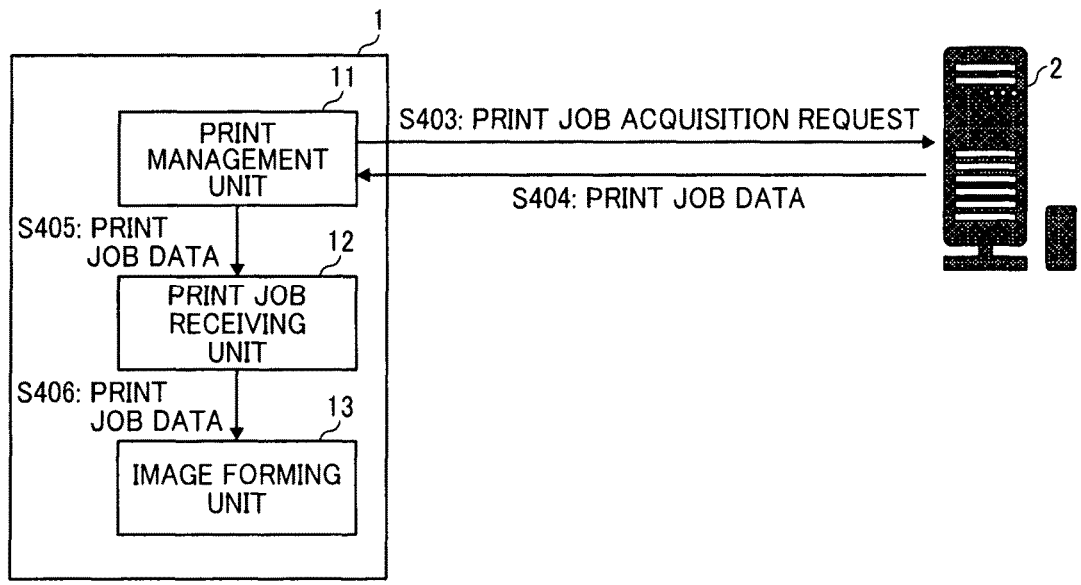
FIG. 18 is an illustration of a flow of information in executing a print job of the pull printing server.

FIG. 18 is an illustration of a flow of information in executing a print job registered in the pull printing server 2. As described above, the print management unit 11 sends a print job acquisition request to the pull printing server 2, and the pull printing server 2 sends back print job data as a response to the print job acquisition request. The print management unit 11 receives the print job data and transmits the received print job data to the image forming unit 13 via the print job receiving unit 12.

When a print job registered in the pull printing server 2 is executed as described above, the print management unit 11 that transmits the print job data can easily monitor the progress of the print job. That is, the print management unit 11 can determine that the print job is in executing during transmitting the print job data to the print job receiving unit 12, and can determine that the execution of the print job is completed when the transmission of the print job data to the print job receiving unit 12 is completed.

By contrast, referring back to FIG. 17, when the selected print job corresponds to a job registered in the push printing server 4 (S402: NO), the print management unit 11 sends a print job start request that is addressed to the push printing server 4 to the pull printing server 2 (S411). This is because the pull printing server 2 is assumed to manage accesses to the push printing server 4. If the print management unit 11 includes a connector to request a start of a print job to the push printing server 4 and the print management unit 11 is enable to request the start of the print job to the push printing server 4, the print management unit 11 may send the print job start request directly to the push printing server 4.

Additionally, the print job start request includes an ID of a print job to be requested to start transmission, namely, an address and an apparatus ID of the push printing server 4 that is a storage destination of the print job data (destination of the print job start request). The print job start request also includes an address and an apparatus ID of the pull printing server 2 that is a transfer source of the print job start request, and an address and an ID of the image forming apparatus 1 that is a transmission destination of the print job data.

On receiving the print job start request from the print management unit 11, the server cooperation unit 25 of the pull printing server 2 converts the print job start request to a format appropriate for the push printing server 4 using a connector corresponding to the push printing server 4. The server cooperation unit 25 sends the converted print job start request to the push printing server 4. That is, the print job start request sent from the print management unit 11 of the image forming apparatus 1 is transferred to the push printing server 4 via the pull printing server 2.

The print job transmission unit 44 of the push printing server 4 sends a print job start response to the pull printing server 2 in response to receipt of the print job start request. On receiving the print job start response, the server cooperation unit 25 of the pull printing server 2 transfers the print job start response to the image forming apparatus 1. The print management unit 11 of the image forming apparatus 1 receives the print job start response (S412). That is, the the print job start response sent from the print job transmission unit 44 of the push printing server 4 is transferred to the image forming apparatus 1 via the pull printing server 2.

After sending the print job start response, the print job transmission unit 44 of the push printing server 4 starts sending the print job data corresponding to the print job instructed with the print job start request to the image forming apparatus 1, which is the transmission destination of the print job data included in the print job start request. The print job receiving unit 12 of the image forming apparatus 1, then, starts receiving the print job data (S413).

The print job receiving unit 12 transmits the print job data to the image forming unit 13 each time when receiving the print job data from the push printing server 4 (S414). On receiving the print job data from the print job receiving unit 12, the image forming unit 13 performs predetermined processing on the print job data to execute the print job (S415).

The print management unit 11 of the image forming apparatus 1 sends a query to the print job receiving unit 12 at predetermined intervals in response to the print job start response to acquire a reception state of the print job receiving unit 12 for the print job data (S416).

If the print job receiving unit 12 is in a middle of receiving the print job data (S417: YES), the print management unit 11 determines that the print job is in a middle of being executed, and the process returns to the S416. As a result, even when a plurality of the print jobs are selected by the user, the print management unit 11 does not acquire the next print job data from the pull printing server 2 until the print job receiving unit 12 completes receiving the current print job data. This prevents execution of the next print job in the middle of receiving the print job data of the current print job.

Here in the embodiment, the print management unit 11 may perform S416 and S417 after S411. That is, the print management unit 11 may acquire the reception state and determine an execution state of the print job right after sending the print job start request.

On the other hand, if the print job receiving unit 12 is not receiving the print job data (S417: NO), the print management unit 11 determines that execution of the print job is completed, and sends a result of printing to the push printing server 4 via the pull printing server 2 (S409).

When not all of the one or more print jobs selected by the user are completed (S410: NO), the process returns to S401, and the print management unit 11 selects a next print job to be executed. On the other hand, when all of the one or more print jobs selected by the user are completed (S410: YES), the process of executing the one or more print jobs is completed.

Figure 19:
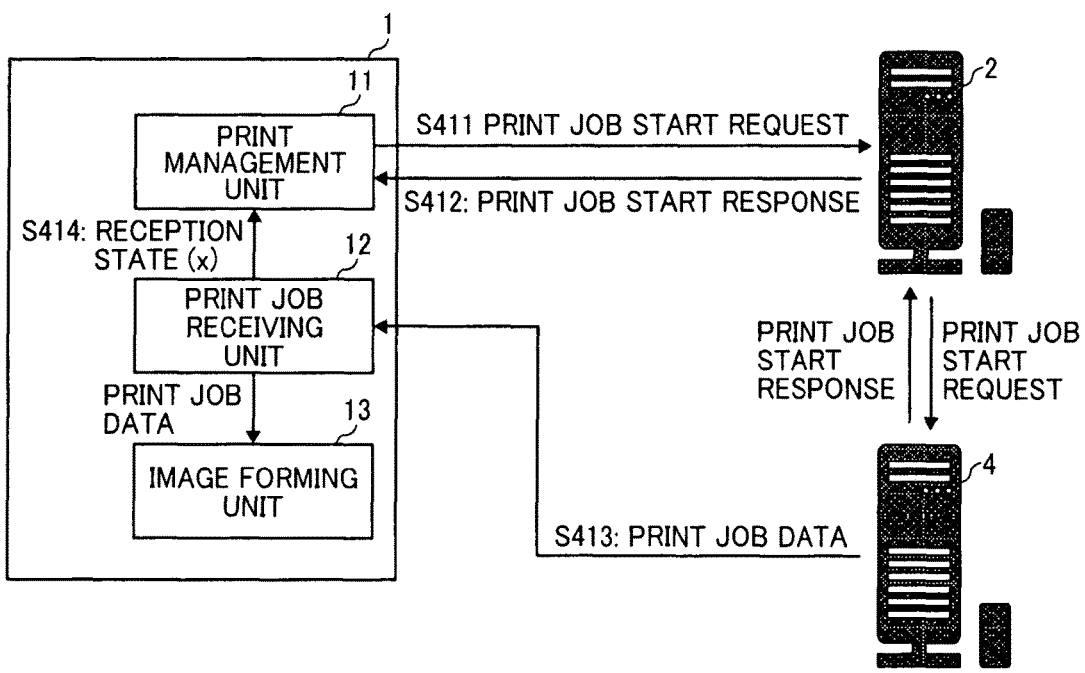
FIG. 19 is an illustration of a flow of information in executing a print job of the push printing server.

FIG. 19 is an illustration of a flow of information in executing a print job registered in the push printing server 4. As described above, the print management unit 11 sends the print job start request to the push printing server 4 via the pull printing server 2. The push printing server 4 sends the print job start response to the image forming apparatus 1 via the pull printing server 2 in response to the print job start request.

In addition, on receiving the print job start request from the image forming apparatus 1, the push printing server 4 starts sending the print job data. On receiving the print job start response from the push printing server 4, the print management unit 11 starts acquiring the reception state of the print job receiving unit 12.

As described above, the print management unit 11 does not transmit the print job data when a print job registered in the push printing server 4 is executed, and does not directly monitor the progress of executing the print job. The print management unit 11, however, can indirectly monitor the progress of executing the print job by acquiring the reception state of the print job receiving unit 12. That is, the print management unit 11 can determine that the print job is being executed while the print job receiving unit 12 is receiving the print job data from the push printing server 4, and can determine that the execution of the print job is completed when the print job receiving unit 12 completes receiving, from the acquired reception state.

As described above, according to the embodiment, the image forming apparatus 1 configuring the pull printing system 6 can also monitor the progress of executing the print job associated with the push printing server 4. This allows the image forming apparatus 1 to manage the progress of executing each of the print jobs registered in the pull printing server 2 and the push printing server 4 and efficiently execute the print jobs in order even when a plurality of print jobs registered in both of the pull printing server 2 and the push printing server 4 are selected by the user. This prevents a case in which, for example, a print job of the pull printing server 2 is executed while a print job of the push printing server 4 is executed, and both print jobs fail due to a time out of the push printing server 4.

In the description above, the image forming apparatus 1 sends a print job acquisition request or a print job start request and sets an address of the print job start request according to a server to which a print job is registered when executing the print job. However, the embodiment is not limited to this, but the image forming apparatus 1 may send the print job acquisition request to the pull printing server 2 regardless of the server.

When operating in this way, the image forming apparatus 1 sends the print job acquisition request including an address and an apparatus ID of the pull printing server 2 that is a destination of the print job acquisition request and an address and an ID of a storage destination of the print job data. When the pull printing server 2 that receives the print job acquisition request is a storage destination, the pull printing server 2 sends the print job data stored therein to the image forming apparatus 1. Alternatively, when a storage destination is the push printing server 4, the pull printing server 2 sends a print job start request to the push printing server 4.

Second Embodiment

A print control system according to a second embodiment of the present disclosure is described below in reference to FIG. 20 and FIG. 21.

Figure 20:
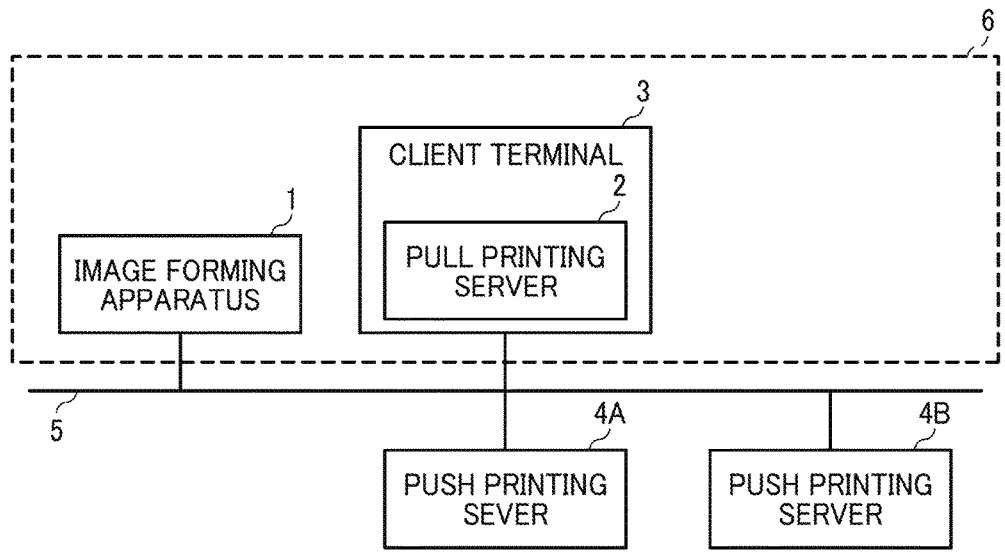
FIG. 20 is a diagram illustrating an example of a print control system according to a second embodiment of the present disclosure.

FIG. 20 is a diagram illustrating an example of the print control system according to the second embodiment. As illustrated in FIG. 20, in the print control system according to this embodiment, a function of a pull printing server 2 is provided in a client terminal 3 (first information processing device). Other parts of the configuration of the system according to this embodiment are the same as the print control system according to the first embodiment.

Figure 21:
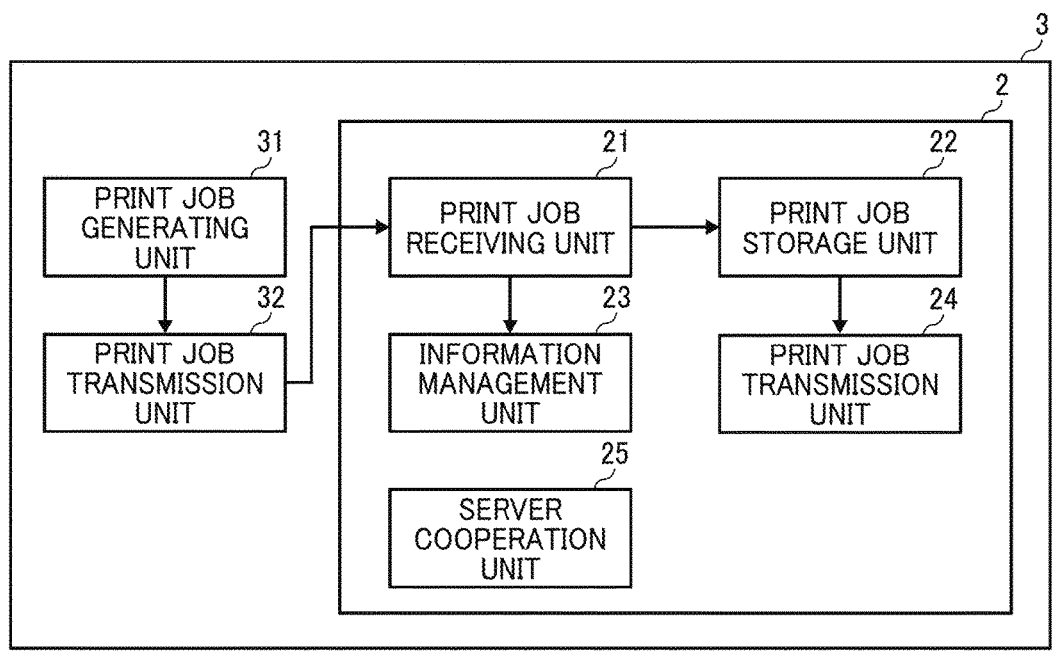
FIG. 21 is a diagram illustrating an example of a functional configuration of a client terminal according to the second embodiment.

FIG. 21 is a diagram illustrating an example of a functional configuration of the client terminal 3 according to this embodiment. The client terminal 3 of FIG. 21 includes a print job generating unit 31, a print job transmission unit (first print job transmission unit) 32, and the pull printing server 2. Each component has the same configuration as the first embodiment. The client terminal 3 can be implemented by installing a server application to perform the function of the pull printing server 2 in the client terminal 3.

Operation of the print control system according to this embodiment is the same as the print control system according to the first embodiment. However, this embodiment is different from the first embodiment in that print job data generated with the print job generating unit 31 is sent from the print job transmission unit 32 to the print job receiving unit 21 without using the network 5, in storing one or more print jobs in the pull printing server 2.

This configuration also can provide the same effect as the first embodiment. That is, the image forming apparatus 1 can monitor the progress of each of the print jobs registered in the pull printing server 2 and the push printing server 4 and efficiently execute the print jobs in order even when a plurality of print jobs registered in both of the pull printing server 2 and the push printing server 4 are selected by the user. This prevents a case in which, for example, the print job of the pull printing server 2 is executed while the print job of the push printing server 4 is executed, and both of print jobs are failed due to a time out of the print job of the push printing server 4.

Third Embodiment

A print control system according to a third embodiment of the present disclosure is described below in reference to FIG. 22 and FIG. 23. In the third embodiment, a pull printing server (print control device) 2 serves as a quasi-image forming apparatus. A configuration of each component of the print control system according to this embodiment is the same as the print control system according to the first embodiment.

Figure 22:
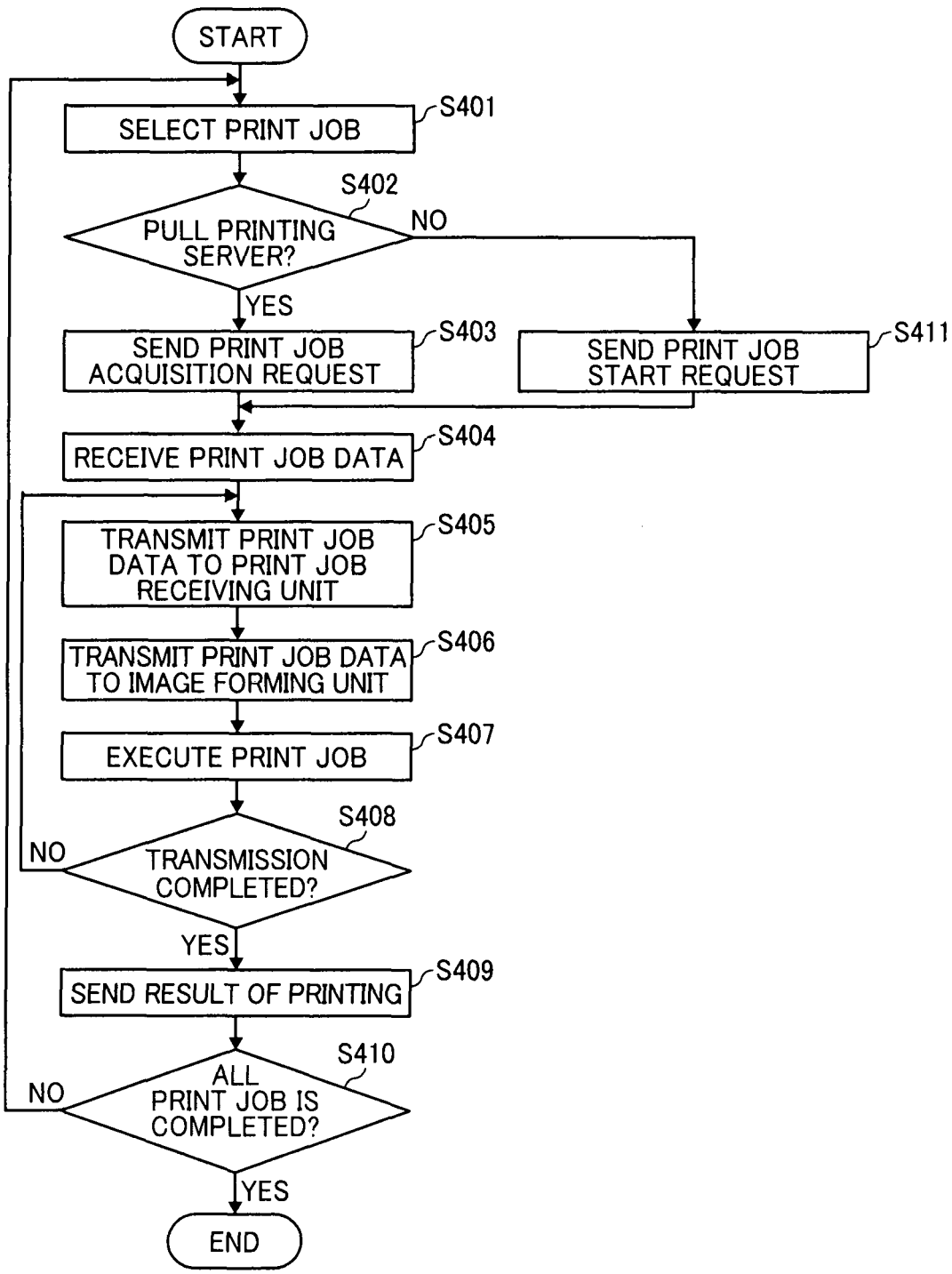
FIG. 22 is a flowchart illustrating an example process of performing a print job according to a third embodiment.

FIG. 22 is a flowchart of an example process of executing a print job by an image forming apparatus 1 according to the third embodiment. The processing of S401 to S411 in FIG. 22 is the same as that in FIG. 17.

As described in FIG. 22, when the print management unit 11 selects a print job registered in the push printing server 4 (S402: NO), the print management unit 11 sends a print job start request to the pull printing server 2 (S411). As described above, the print job start request includes an address and an apparatus ID of the image forming apparatus 1 that is a destination of the print job data.

On receiving the print job start request from the print management unit 11, the server cooperation unit 25 of the pull printing server 2 converts the print job start request to an appropriate format corresponding to the push printing server 4 using a connector corresponding to the push printing server 4. Subsequently, in the converted print job start request, the server cooperation unit 25 changes the destination of the print job data from the image forming apparatus 1 to the pull printing server 2, namely the self-device, and then sends the print job start request to the push printing server 4. At this time, identification information such as a session ID of the print start request or a job ID of a requested print job is stored in a storage device such as the RAM 203, in association with the original destination of the print job data.

The print job transmission unit 44 of the push printing server 4 sends a print job start response to the pull printing server 2 in response to the print job start request. The server cooperation unit 25 of the pull printing server 2, which receives the print job start response, may or may not send the print job start response to the image forming apparatus 1.

According to the embodiment, after sending the print job start response, the print job transmission unit 44 of the push printing server 4 starts sending the print job data corresponding to a print job instructed with the print job start request to the pull printing server 2. Subsequently, the print job transmission unit 24 of the pull printing server 2 specify the image forming apparatus 1 that is the original destination of the print job data, namely a request source of the print job start request, according to the session ID of the print job data transmission or the job ID of the print job that is sent. The print job data received from the push printing server 4 is sent to the specified image forming apparatus 1. The print management unit 11 receives the print job data (S404). Subsequent processing is the same as the first embodiment.

Figure 23:
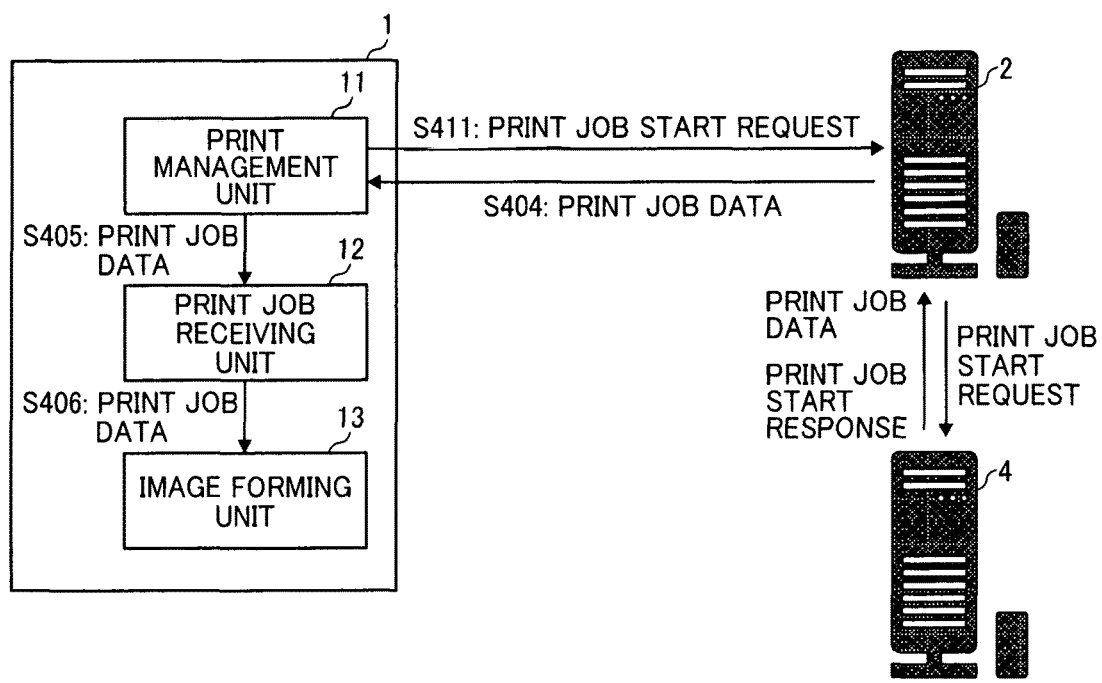
FIG. 23 is an illustration of a flow of information in executing a print job of the push printing server according to the third embodiment.

FIG. 23 is an illustration of a flow of information in executing a print job registered in the push printing server 4 according to this embodiment. As described above, the print management unit 11 sends a print job start request to the pull printing server 2. The pull printing server 2 changes a destination of the print job start request to the self-device and sends the changed print job start request to the push printing server 4. The push printing server 4 sends the print job start response to the pull printing server 2 in response to the print job start request.

The push printing server 4 also transmits print job data corresponding to a print job instructed with the print job start request to the pull printing server 2 in response to the print job start request. At this time, the pull printing server 2 serves as a quasi-image forming apparatus for the push printing server 4. After that, the pull printing server 2 sends the print job data received from the push printing server 4 to the print management unit 11 of the image forming apparatus 1.

As described above, according to the embodiment, when executing the print job registered in the push printing server 4, the pull printing server 2 receives the print job data from the push printing server 4 and transfers the print job data to the print management unit 11 of the image forming apparatus 1. Through this, the print management unit 11 can transmit the print job data to the print job receiving unit 12 in the same way as executing the print job registered in the pull printing server 2 even when the print job registered in the push printing server 4 is to be executed. That is, the print management unit 11 can directly monitor the progress of each of the print jobs and efficiently execute the print jobs in order. This prevents a case in which, for example, the print job of the pull printing server 2 is executed while the print job of the push printing server 4 is executed, and both of print jobs are failed due to a time out of the print job of the push printing server 4.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), DSP (digital signal processor), FPGA (field programmable gate array) and conventional circuit components arranged to perform the recited functions.

Although the embodiments of the disclosure have been described and illustrated above, such description is not intended to limit the disclosure to the illustrated embodiments. Numerous additional modifications and variations are possible in light of the above teachings. It is therefore to be understood that within the scope of the appended claims, the embodiments may be practiced otherwise than as specifically described herein. For example, elements and/or features of different illustrative embodiments may be combined with each other and/or substituted for each other within the scope of this disclosure and appended claims.

What is claimed is:

1. An image forming apparatus, comprising:
   a memory and a processor, the memory containing computer readable code executable by the processor to configure the processor to,
   send a print job acquisition request that requests acquisition of print job data to a first information processing apparatus through a network, receive first print job data and second print job data sent from the first information processing apparatus and a second information processing apparatus, respectively, as a response to the print job acquisition request through the network, the first information processing apparatus being a pull-print server, the second information processing apparatus being a push-print server, send a print job start request to the second information processing apparatus via the first information processing apparatus, the print job start request requesting the second information processing apparatus send second print job data to the image forming apparatus, receive, in response to the print job start request, a print job start response from the second information processing apparatus via the first information processing apparatus such that the first information processing apparatus acts as a relay between the image forming apparatus and the push-print server, wherein the first information processing apparatus provides the first print job data and the second print job data to the image forming apparatus by extracting the first print job data stored in the first information processing apparatus, receiving the second print job data stored in the second information processing apparatus from the second information processing apparatus in response to the print job start request sent thereto, combining the first print job data and the second print job data to generate combined print job data, and transmitting the first print job data and the second print job data to the image forming apparatus within the combined print job data, compile status information indicating whether the the second print job data is being received in response to receiving the print job start response to the print job start request from the second information processing apparatus, execute a print job corresponding at least one of the first print job data and the second print job data, and determine, after receiving the print job start response, whether the print job corresponding to the second print job data is complete based on the status information.

2. The image forming apparatus of claim 1, wherein, in response to a user instruction and based on information including job identification information identifying print job data of a current print job and storage destination identification information identifying a storage destination of the print job data of the current print job, which are received from the first information processing apparatus, the processor is configured to, send the print job acquisition request including job identification information on the current print job to the first information processing apparatus when the storage destination identification information of the current print job indicates the first information processing apparatus, and send the print job start request including job identification information on the current print job to the second information processing apparatus when the storage destination identification information of the current print job indicates the second information processing apparatus.

3. The image forming apparatus of claim 1, wherein the processor is configured to, send the print job start request to the second information processing apparatus via the first information processing apparatus, and receive the print job start response from the second information processing apparatus via the first information processing apparatus.

4. The image forming apparatus of claim 1, wherein the processor is configured to prohibit transmission of the print job acquisition request to the first information processing apparatus, in response to the status information indicating that the second print job data is being received from the second information processing apparatus.

5. The image forming apparatus of claim 4, wherein, after receiving the print job start response from the second information processing apparatus, the processor is configured to send the print job acquisition request to the first information processing apparatus based on a determination that the status information indicates that the second print job data is not being received from the second information processing apparatus.

6. The image forming apparatus of claim 4, wherein, after receiving the print job start response from the second information processing apparatus, the processor is configured to send a result of executing a current print job according to the second print job data sent from the second information processing apparatus to the first information processing apparatus based on a determination that the status information indicates that the second print job data is not being received from the second information processing apparatus.

7. A print control system, comprising:

an image forming apparatus to send a print job acquisition request;

a first information processing apparatus, the first information processing apparatus being a pull-print server such that the first information processing apparatus is configured to transmit first print job data to the image forming apparatus through a network in response to receiving the print job acquisition request from the image forming apparatus; and a second information processing apparatus, the second information processing apparatus being a push-print server such that the second information processing apparatus is configured to transmit second print job data to the image forming apparatus via the first information processing apparatus and the first information processing apparatus provides the first print job data and the second print job data to the image forming apparatus by extracting print jobs stored in the first information processing apparatus, receiving the second print job data stored in the second information processing apparatus from the second information processing apparatus in response to a print job start request sent thereto, combining the first print job data and the second print job data to generate combined print job data, and transmitting the first print job data and the second print job data to the image forming apparatus within the combined print job data, wherein the image forming apparatus includes a memory and a processor, the memory containing computer readable code executable by the processor to configure the processor to, receive the first print job data sent from the first information processing apparatus through the network in response to the print job acquisition request sent to the first information processing apparatus;

send the print job start request to the second information processing apparatus via the first information processing apparatus, the print job start request requesting the second information processing apparatus send second print job data to the image forming apparatus;

receive, in response to the print job start request, a print job start response from the second information processing apparatus via the first information processing apparatus such that the first information processing apparatus acts as a relay between the image forming apparatus and the push-print server;

receive the second print job data from the second information processing apparatus through the network such that the image forming apparatus receives the second print job data without sending the print job acquisition request to the second information processing apparatus;

compile status information indicating whether the second print job data is being received in response to receiving the print job start response to the print job start request from the second information processing apparatus;

execute at least one of a first print job corresponding to the first print job data and a second print job corresponding to the second print job data; and determine, after receiving the print job start response, whether the second print job corresponding to the second print job data is complete based on the status information.

8. The print control system of claim 7, wherein, in response to a user instruction and based on information including job identification information identifying print job data of a current print job and storage destination identification information identifying a storage destination of the print job data of the current print job, which are received from the first information processing apparatus, the image forming apparatus is configured to, send the print job acquisition request including job identification information on the current print job to the first information processing apparatus when the storage destination identification information of the current print job indicates the first information processing apparatus, and send the print job start request including job identification information on the current print job to the second information processing apparatus when the storage destination identification information of the current print job indicates the second information processing apparatus.

9. The print control system of claim 7, wherein the image forming apparatus is configured to, send the print job start request to the second information processing apparatus via the first information processing apparatus, and receive the print job start response from the second information processing apparatus via the first information processing apparatus.

10. The print control system of claim 7, wherein, the image forming apparatus is configured to prohibit transmission of the print job acquisition request to the first information processing apparatus, in response to the status information indicating that the second print job data is being received from the second information processing apparatus.

11. The print control system of claim 10, wherein, after receiving the print job start response from the second information processing apparatus, the image forming apparatus is configured to send the print job acquisition request to the first information processing apparatus based on a determination that the status information indicates that the second print job data is not being received from the second information processing apparatus.

12. The print control system of claim 10, wherein, after receiving the print job start response from the second information processing apparatus, the image forming apparatus is configured to send a result of executing a current print job according to the second print job data sent from the second information processing apparatus to the first information processing apparatus based on a determination that the status information indicates that the second print job data is not being received from the second information processing apparatus.

13. A print control method for an image forming apparatus, comprising:

sending a print job acquisition request that requests acquisition of print job data to a first information processing apparatus to which the image forming apparatus is connected via a network;

receiving first print job data and second print job data sent from the first information processing apparatus and a second information processing apparatus, respectively, as a response to the print job acquisition request, the first information processing apparatus being a pull-print server, the second information processing apparatus being a push-print server, sending a print job start request to the second information processing apparatus via the first information processing apparatus, the print job start request requesting the second information processing apparatus send second print job data to the image forming apparatus;

receiving, in response to the print job start request, a print job start response from the second information processing apparatus via the first information processing apparatus such that the first information processing apparatus acts as a relay between the image forming apparatus and the push-print server, wherein the first information processing apparatus provides the first print job data and the second print job data to the image forming apparatus by extracting the first print job data stored in the first information processing apparatus, receiving the second print job data stored in the second information processing apparatus from the second information processing apparatus in response to the print job start request sent thereto, combining the first print job data and the second print job data to generate combined print job data, and transmitting the first print job data and the second print job data to the image forming apparatus within the combined print job data;

compiling status information indicating whether the the second print job data is being received in response to receiving the print job start response to the print job start request from the second information processing apparatus;

executing at least one of a first print job corresponding to the first print job data and a second print job corresponding to the second print job data; and determining, after receiving the print job start response, whether a print job corresponding to the second print job data is complete based on the status information.

14. The print control method of claim 13, further comprising:

in response to a user instruction and based on information including job identification information identifying print job data of a current print job and storage destination identification information identifying a storage destination of the print job data of the current print job, which are received from the first information processing apparatus, sending the print job acquisition request including job identification information on the current print job to the first information processing apparatus when the storage destination identification information of the current print job indicates the first information processing apparatus, and sending the print job start request including job identification information on the current print job to the second information processing apparatus when the storage destination identification information of the current print job indicates the second information processing apparatus.

15. The print control method of claim 13, wherein the sending the print job start request includes sending the print job start request to the second information processing apparatus via the first information processing apparatus, and the receiving the print job start response includes receiving the print job start response from the second information processing apparatus via the first information processing apparatus.

16. The print control method of claim 13, further comprising:

determining whether the status information indicates that the second print job data is being received from the second information processing apparatus, after receiving the print job start response from the second information processing apparatus; and prohibiting transmission of the print job acquisition request to the first information processing apparatus when the determining determines that the status information indicates that the second print job data is being received.

17. The print control method of claim 16, further comprising:

determining whether the status information indicates that the second print job data is being received from the second information processing apparatus, after receiving the print job start response from the second information processing apparatus; and sending the print job acquisition request to the first information processing apparatus when the determining determines that the status information indicates that the second print job data is not being received.

18. The print control method of claim 16, further comprising:

sending, after receiving the print job start response from the second information processing apparatus, a result of executing a current print job according to the second print job data sent from the second information processing apparatus to the first information processing apparatus based on a determination that the status information indicates that the second print job data is not being received from the second information processing apparatus.

* * * * *